United States Patent [19]
Stover

[11] Patent Number: 5,222,675
[45] Date of Patent: Jun. 29, 1993

[54] SEED COTTON MODULE HANDLER WITH WET AND/OR DIRTY COTTON SEPARATOR

[75] Inventor: Jimmy R. Stover, Cotton County, Okla.

[73] Assignee: Western Steel Co., Inc., Corpus Christi, Tex. ; a part interest

[21] Appl. No.: 753,961

[22] Filed: Sep. 3, 1991

[51] Int. Cl.⁵ .............................................. B07C 5/36
[52] U.S. Cl. ................................ 241/101.1; 209/616; 241/605
[58] Field of Search ............. 241/101.01, 165.5, 605; 19/2, 80, 81; 209/616

[56] References Cited

U.S. PATENT DOCUMENTS

| | | | |
|---|---|---|---|
| 3,360,831 | 1/1968 | Morikawa et al. | |
| 3,381,341 | 5/1968 | Platt | |
| 3,470,585 | 10/1969 | Just | 19/81 |
| 3,971,103 | 6/1976 | Ono | 19/2 |
| 4,190,933 | 4/1980 | Jagst | 19/81 |
| 4,192,042 | 3/1980 | Jagst | 19/81 |
| 4,244,082 | 1/1981 | Leifeld et al. | 19/81 |
| 4,281,437 | 8/1981 | Marx | 19/80 |
| 4,484,684 | 11/1984 | Tetreault | 209/616 |
| 4,844,353 | 4/1989 | Houle | 241/294 |
| 5,121,841 | 6/1992 | Harrington | 241/101.01 X |

Primary Examiner—Douglas D. Watts
Attorney, Agent, or Firm—G. Turner Moller

[57] ABSTRACT

A cotton module handling system includes one or more feeder beds delivering seed cotton modules into a feeder head to disintegrate the module into a large number of small clumps of cotton, seed and plant trash for transport into a gin. A shaver assembly is provided, upstream of the feeder head, for removing part of the bottom of the module to remove a band of wet and/or dirty cotton.

23 Claims, 2 Drawing Sheets

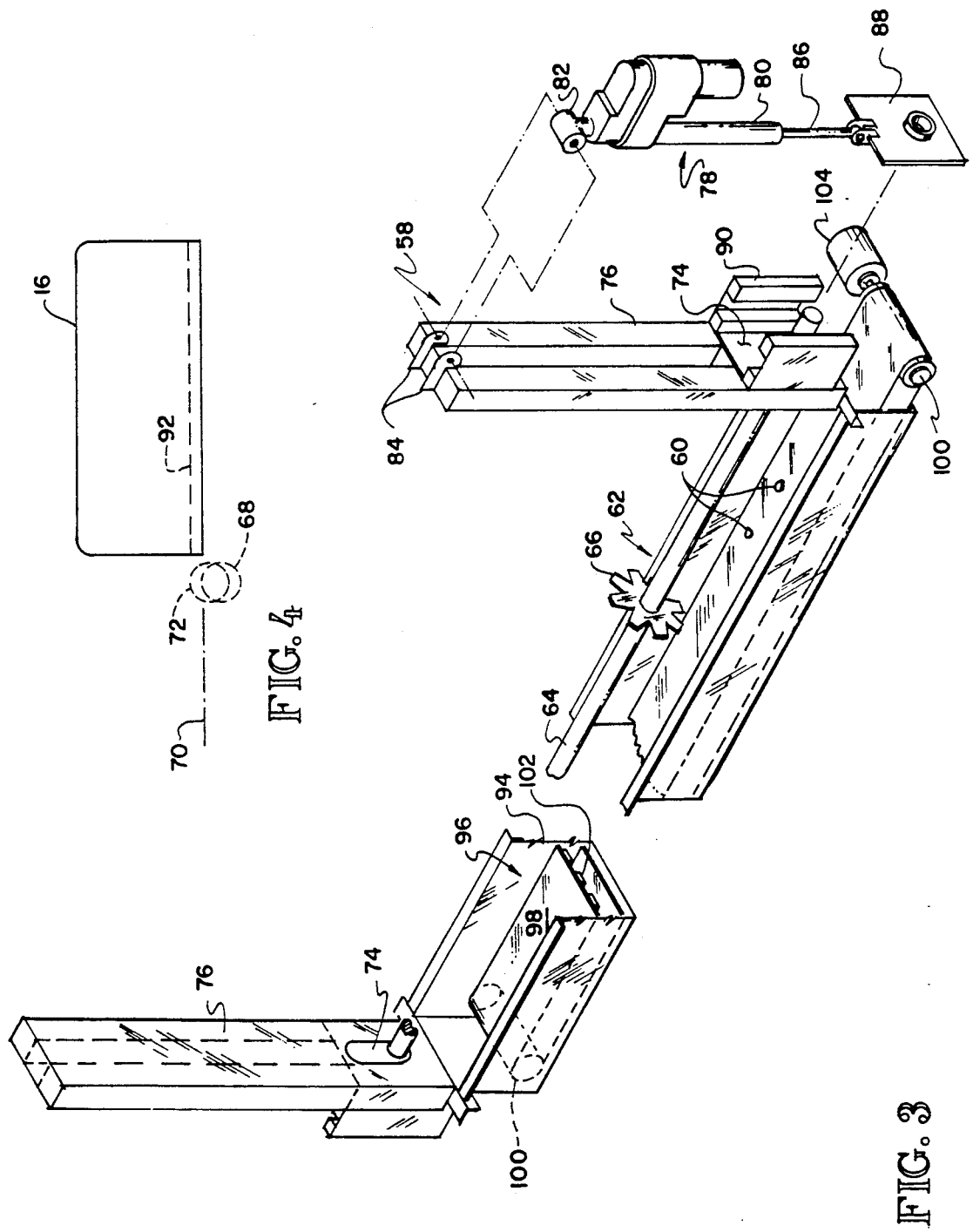

SEED COTTON MODULE HANDLER WITH WET AND/OR DIRTY COTTON SEPARATOR

This invention relates to equipment for handling seed cotton modules and more particularly to a device for removing a lower portion of a cotton module.

Recently, the handling of seed cotton from the field to the gin has changed dramatically. Past practice was to dump a picker or stripper container into a cotton trailer, tow the trailer to the gin and leave it until the trailer was emptied into the gin inlet and the cotton ginned. Recently, cotton module makers have become popular. Module makers receive seed cotton on the edge of a field and compress it into a large bundle called a module. A plastic cover is usually placed on top of the module to shed water. After a while, the module is transported to the gin on the back of a large truck. At the gin, the module is picked up and placed on a feeder bed which moves the module into a feeder head where the module is broken up into small clumps of cotton fibers, seed and plant parts. These clumps are delivered to the gin for treatment in a conventional manner.

Although packing seed cotton into modules has many advantages, one problem is that the quality of the cotton fibers on the bottom of the module degrade for the simple reason that the bottom of the module gets wet and dirty from sitting on the ground. Even though the fibers may dry out before grading, after cotton fibers get wet and dirty, they naturally do not grade as well as clean, dry fibers and are not as valuable so the cotton buyer pays less and the farmer receives less.

Fortunately, the proportion of wet, dirty fibers in a module is rather small and strategies have developed to minimize the effect of wet, dirty cotton on the grade. For example, the cotton samples used to determine the bale grade are often taken when the module first moves into the feeder head and cotton fibers are first taken off the module. If the dispersing drums in the feeder head are inclined toward the module, the first cotton removed from the module is from the top so no wet, dirty cotton appears in the sample. The wet, dirty cotton from the bottom of the module is then blended throughout the bale so its effect on the grade is minimized and hopefully not noticed. Unfortunately for the farmer, cotton graders and/or buyers are not fools and protect themselves by other strategies.

It is known in the prior art to break up ginned cotton bales upstream of a textile operation by removing cotton fibers from the bottom of the bale as shown in U.S. Pat. Nos. 3,360,831; 3,381,341; 3,470,585; 3,971,103; 4,190,933; 4,192,042; 4,244,082 and 4,844,353. Of more general interest is the disclosure in U.S. Pat. Nos. 4,281,437 and 4,484,684.

The approach of this invention is to remove wet and/or dirty seed cotton from the bottom of the module before processing in the gin. The wet, dirty seed cotton is discarded or used for low grade purposes. The module, having the bottom shaved off, is then moved into the feeder head or the feeder head is moved onto the module. The module is thus broken up by dispersing drums in a conventional manner with the clean, dry seed cotton delivered to the gin. The shaver assembly of this invention is adjustable to remove a variable amount of cotton from the bottom of the module so the discarded wet and/or dirty seed cotton is minimized without throwing away clean, dry seed cotton.

It is an object of this invention to provide an improved cotton module handling system which removes a bottom portion of a cotton module.

Another object of this invention is to provide a cotton module handling device which removes a bottom portion of a cotton module as it moves toward a feeder head.

A further object of this invention is to provide an improved method of handling cotton modules in which a quantity of wet and/or dirty seed cotton is removed from the bottom of the module.

These and other objects of this invention will become more fully apparent as this description proceeds, reference being made to the accompanying drawing and appended claims.

IN THE DRAWINGS

FIG. 3 is a partly exploded, partly broken, enlarged isometric view of the shaver assembly; and FIG. 4 is a schematic view of a seed cotton module and its relation with the shaving assembly of this invention.

Figure 1:
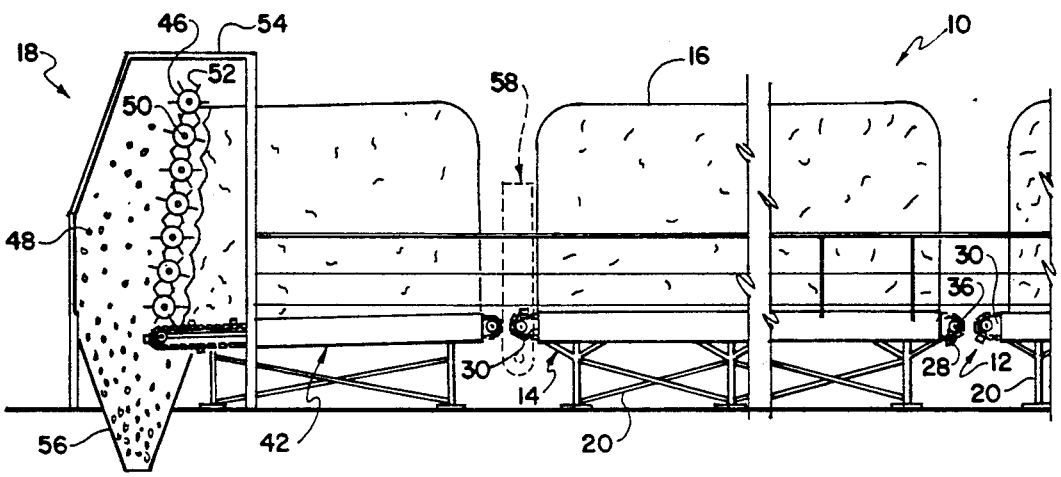
FIG. 1 is a longitudinal cross-sectional view of a cotton module handling system incorporating one or more feeder beds, a module bottom shaver and a feeder head.
Figure 2:
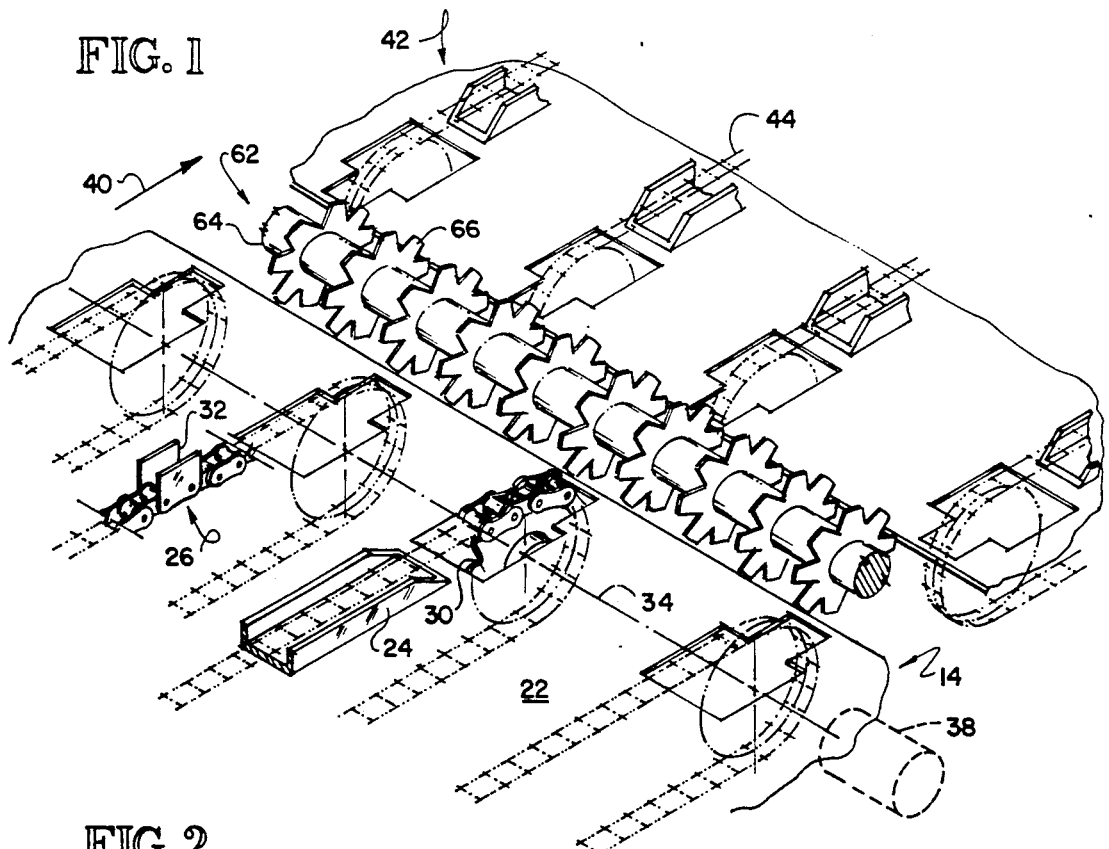
FIG. 2 is an enlarged isometric view of part of one of the feeder beds, illustrating the chain drive arrangement and part of the shaver assembly.

Referring to FIG. 1, a cotton module handling system 10 comprises one or more feeder beds 12, 14 delivering seed cotton modules 16 into a feeder head 18 of either the stationary or traveling type where the modules 16 are broken up into clumps of cotton fiber and seed. As used herein, the phrase moving the cotton module relative to the feeder head includes moving the cotton module toward the feeder head, moving the feeder head toward the cotton module and moving both the cotton module and the feeder head toward each other.

These clumps are transported to a gin (not shown) where the cotton is removed from the seed, plant stems, leaves and other trash and then baled for shipment. The seed is also separated for sale and the trash collected for composting, burning or other disposal.

The feeder beds 12, 14 have many conventional components and include a frame 20 supporting a horizontal upper plate 22 having a series of longitudinal tracks 24 supporting a plurality of parallel chains 26. The chains 26 extend along the tracks 24 and over sprockets 28, 30 at opposite ends of the feeder beds 12, 14. The chains 26 provide an upwardly extending prong or shoulder 32 for gripping the bottom of the modules 16 and moving the modules 16 toward or away from the feeder head 18. The sprockets 28, 30 are mounted on shafts 34, 36. One or more electric motors 38 drive one or both shafts 34, 36 to normally advance the modules 16 along a path toward the feeder head 18 as shown by the arrow 40.

The feeder head 18 is of conventional design having a feeder bed 42 providing motor driven feeder chains 44, similar to the chains 28, for advancing the modules 16 into a series of power driven disperser drums 46 which separate the modules 16 into a vast number of clumps 48 of cotton fiber, seed, stems and leaves. Each disperser drum 46 includes a shaft 50 extending transversely across the feeder head 18, means (not shown) for drivably rotating the shaft 50 and a series of discs, fingers, cutter heads 52 or the like. A hood 54 is open at the module inlet end for receiving the modules 16 and includes a discharge outlet 56 for delivering the clumps 48 to the gin. Those skilled in the art will recognize the cotton module handling system 10, as heretofore described, as being typical of cotton module handling systems.

It has been known that the cotton fibers on the bottom of cotton modules have become wet and dirty since modules were first introduced. This is no secret and can be easily observed in almost all modules. The cause is easy to detect—modules sit on the ground in the field. Universal past practice is to blend the wet and/or dirty fibers throughout the bales made from the module to minimize the grading effect of the dirty fibers on the resultant bales. This has evidently been satisfactory because it is universally practiced.

It has been learned that wet and/or dirty fibers on the bottom of the module can be removed as it is moved relative to the feeder head 18, preferably as the module is moved toward the feeder head 18. To this end, the feeder bed 14 provides a shaver assembly 58 (FIG. 3) for removing a portion of the module 16 from the bottom in the form of clumps 60 of seed cotton and plant trash. The clumps 60 are then transported away from the feeder head 18 for different treatment than the clumps 48. Preferably, the assembly 58 is located at the junction between adjacent feeder beds and conveniently is located at the discharge end of the feeder bed 14.

The assembly 58 includes a shaving or cutting element 62 including a shaft 64 having a multiplicity of discs, fingers or cutter heads 66 thereon. The shaft 64 is driven in any suitable manner, as by the provision of a pulley, belt and electric motor (not shown). The exact size and shape of the discs 66 is subject to wide variation and in many ways the shaving element 62 may be identical to the disperser drums 46 because the immediate purpose is essentially the same, i.e. to break up the cotton modules 16 into a large number of clumps of material which can be readily transported. The discs 66 are essentially multitoothed structures fixed to the shaft 64 and tilted slightly relative to the shaft axis. Rotation of the shaft 64 causes the discs 66 to oscillate slightly relative to the overlying cotton module and remove part of the module bottom.

The shaving element 62 is mounted for adjustable movement between a first position 68 below a plane 70 defined by the load supporting surfaces of the feeder bed 14 and a second position 72 above the plane 70 as shown best in FIG. 4. To this end, the shaft 64 extends beyond the sides of the feeder bed 14 and are journalled by a pair of spaced bearing blocks 74 mounted for vertical movement in a pair of aligned support 76. A linear motor 78, which may be of any suitable type such as pneumatic, hydraulic or electric, includes a cylinder end 80 having a hook 82 pinned to a pair of brackets 84 carried by the support 76. Although the motor 78 may be of any suitable type, it is conveniently a Model SPA 6415-12, available from Duff-Norton Co. The motor 78 also includes a piston end 86 attached at the other end to a bearing block 88 received in a pair of guides 90 affixed to the support 76. It will be seen that the cutting element 62 can be raised from the position 68 underneath the module 16 to the position 72 where the cutting discs 66 remove part of the underside of the module 16, suggested by the dotted line 92 in FIG. 4, as it moves toward the feeder head 18.

The clumps 60 of cotton fiber, seed, stem and leaf cut off the bottom of the module 16 fall into a trough 94 below the shaft 62 as shown best in FIG. 3. Suitable means are provided to transport the clumps 60 away from the feeder head 18 in a direction different than movement of the clean cotton clumps 48. To this end, a conveyor 96 is positioned in the trough 94 and delivers the clumps 60 laterally of the shaver assembly 58. The conveyor 96 is conveniently a belt type conveyor including an endless belt 98 extended over rollers 100. The upper flight of the belt 98 is supported by a framework 102 in the trough 94. The framework 102 preferably extends beyond the end of the trough 94 so the clumps 60 discharge from the belt 98, preferably onto a second conveyor (not shown) transporting the wet and/or dirty cotton to a desired location away from the clean, dry cotton remaining in the module 16. The conveyor 96 may be driven in any suitable manner, as by the use of a motor 104 driving one of the rollers 100.

Operation of the cotton module handling system 10 and particularly the shaving assembly 58 is now apparent. When a seed cotton module 16 moves along the feeder beds 12, 14, or beforehand, a judgment is made of how much of the bottom is to be removed by the shaver assembly 58. This judgment may be done by the operator, looking at the module 16 and using his experience, or may be done by sensors (not shown) placed in the feeder beds 12, 14. As the module 16 approaches the shaver assembly 58, a control is manipulated, either by the operator or the sensors, to adjust the position of the linear motor 78 and thereby raise or lower the cutting discs 66 above or below the plane 70. If the operator sees dirty cotton remaining on the module as it passes over the shaver assembly 58, the operator can raise the shaver assembly 58 to remove additional seed cotton from the bottom of the module.

The dirty cotton clumps 60 removed from the module drop into the trough 94 and are transported by the conveyor 96 away from the feeder head 18 and away from the path of movement of the clean clumps 48. The clumps 60 are thus discarded or diverted to a low quality use.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A seed cotton module handling system comprising
a feeder head for separating a seed cotton module having a top, sides, ends and a bottom into a multiplicity of clumps of cotton fiber, seed and plant parts;
means for moving the cotton module relative to the feeder head; and
means upstream of the feeder head for removing a portion off the bottom of the cotton module including means for transporting the separated portion of the cotton module away from the feeder head.

2. The seed cotton module handling system of claim 1 further comprising means for supporting the module and means for adjustably mounting the removing means toward and away from the supporting means.

3. The seed cotton module handling system of claim 2 wherein the removing means comprises a shaft having a plurality of cutting members affixed to the shaft at axially spaced locations thereon and means for rotating the shaft.

4. The seed cotton module handling system of claim 3 wherein the adjustably mounting means comprises means for adjustably raising and lowering the shaft.

5. The seed cotton module handling system of claim 3 wherein the cutting members create a multiplicity of wet/dirty clumps from the bottom of the cotton module, the cotton module and feeder head move relative to a path of movement, and the means transporting the separated portion of the cotton module comprises a trough under the shaft and a conveyor in the trough for discharging the wet/dirty clumps laterally of the path of movement.

6. The seed cotton module handling system of claim 5 wherein the conveyor is a belt conveyor including an endless belt, a plurality of rollers supporting the belt and means for driving one of the rollers.

7. The seed cotton module handling system of claim 1 wherein the moving means comprises means for transporting the cotton module toward the feeder head.

8. The seed cotton module handling system of claim 7 wherein the moving means comprises a feeder bed for supporting the bottom of the cotton module and including a plurality of laterally spaced chains having means thereon for gripping the cotton module.

9. A seed cotton module handling system comprising
a feeder head for separating a cotton module having a top, sides, ends and a bottom into a multiplicity of clumps of cotton fiber, seed and plant parts;
means for moving the cotton module relative to the feeder head along a predetermined path; and
means upstream of the feeder head for removing a portion off the bottom of the cotton module including
a shaver assembly mounted in the path for separating the portion from the cotton module; and
means adjustably mounting the shaver assembly relative to the path for varying the size of the separated portion.

10. The seed cotton module handling system of claim 9 wherein the shaver assembly comprises a shaft having a plurality of cutting discs affixed to the shaft at axially spaced locations thereon and means for rotating the shaft.

11. The seed cotton module handling system of claim 10 wherein the adjustably mounting means comprises means for adjustably raising and lowering the shaft.

12. The seed cotton module of claim 9 wherein the moving means comprises means for transporting the cotton module toward the feeder head.

13. A method of handling a seed cotton module comprising
moving a seed cotton module relative to a feeder head for breaking up the module into a multiplicity of clumps of cotton fiber, seed, stem and leaf; and
removing a bottom portion of the seed cotton module upstream of the feeder head.

14. The method of claim 13 further comprising transporting the clumps along a first path toward a cotton gin and transporting the removed portion along a second path separate from the first path.

15. The method of claim 13 wherein the moving step comprises moving the cotton module toward the feeder head.

16. A method of handling a seed cotton module handling system comprising a feeder head for breaking up a seed cotton module having a top, sides, ends and a bottom into a multiplicity of clumps of cotton fiber, seed and plant parts, means for moving the cotton module relative to the feeder head and means for removing a portion off the bottom of the cotton module including means for transporting the separated portion of the cotton module away from the feeder head, the method comprising
moving the cotton module relative to the feeder head for breaking up the module into a multiplicity of clumps of cotton fiber, seed and plant parts; and
removing a portion of the cotton module from the bottom of the module at a location upstream from the feeder head and transporting the separated portion of the cotton module away from the feeder head.

17. A seed cotton module handling system comprising
a feeder head for separating a seed cotton module having a top, sides, ends and a bottom into a multiplicity of clumps of cotton fiber, seed and plant parts;
means for moving the cotton module toward the feeder head including means for supporting the module; and
means for removing a portion off the bottom of the cotton module including means for transporting the separated portion of the cotton module away from the feeder head and means for adjustably mounting the removing means toward and away from the supporting means, the removing means comprising a shaft having a plurality of cutting members affixed to the shaft at axially spaced locations thereon and means for rotating the shaft.

18. The seed cotton module handling system of claim 17 wherein the adjustably mounting means comprises means for adjustably raising and lowering the shaft.

19. The seed cotton module handling system of claim 17 wherein the cutting members create a multiplicity of wet/dirty clumps from the bottom of the cotton module, the cotton module and feeder head move relative to a path of movement, and the means transporting the separated portion of the cotton module comprises a trough under the shaft and a conveyor in the trough for discharging the wet/dirty clumps laterally of the path of movement.

20. The seed cotton module handling system of claim 17 wherein the conveyor is a belt conveyor including an endless belt, a plurality of rollers supporting the belt and means for driving one of the rollers.

21. The seed cotton module handling system of claim 1 wherein the means for moving the cotton module comprises a pair of spaced conveyors and the means for removing a portion off the bottom of the cotton module is positioned between the conveyors.

22. The seed cotton module handling system of claim 9 wherein the means for moving the cotton module comprises a pair of spaced conveyors and the means for removing a portion off the bottom of the cotton module is positioned between the conveyors.

23. A seed cotton module handling system comprising
a feeder head for separating a seed cotton module having a top, sides, ends and a bottom into a multiplicity of clumps of cotton fiber, seed and plant parts;
means for moving the cotton module relative to the feeder head including a pair of spaced conveyors; and
means for removing a portion off the bottom of the cotton module at a location between the conveyors including means for transporting the separated portion of the cotton module away from the feeder head.

* * * * *